United States Patent
Oh

(10) Patent No.: US 11,626,028 B2
(45) Date of Patent: Apr. 11, 2023

(54) SYSTEM AND METHOD FOR PROVIDING VEHICLE FUNCTION GUIDANCE AND VIRTUAL TEST-DRIVING EXPERIENCE BASED ON AUGMENTED REALITY CONTENT

(71) Applicant: INVENTIS CO., LTD, Seoul (KR)

(72) Inventor: Hoon Tack Oh, Seoul (KR)

(73) Assignee: INVENTIS CO., LTD, Seoul (KR)

(*) Notice: Subject to any disclaimer, the term of this patent is extended or adjusted under 35 U.S.C. 154(b) by 341 days.

(21) Appl. No.: 16/944,984

(22) Filed: Jul. 31, 2020

(65) Prior Publication Data

US 2022/0036758 A1 Feb. 3, 2022

(51) Int. Cl.
- G09B 9/05 (2006.01)
- G09B 19/16 (2006.01)
- G06T 19/00 (2011.01)
- G06F 3/01 (2006.01)
- G06T 13/40 (2011.01)

(52) U.S. Cl.
CPC .............. *G09B 9/05* (2013.01); *G06F 3/011* (2013.01); *G06F 3/016* (2013.01); *G06T 13/40* (2013.01); *G06T 19/006* (2013.01); *G09B 19/167* (2013.01)

(58) Field of Classification Search
None
See application file for complete search history.

(56) References Cited

U.S. PATENT DOCUMENTS

| 2018/0204478 A1* | 7/2018 | Banga | G09B 9/042 |
| 2020/0020244 A1* | 1/2020 | Best | G09B 9/052 |
| 2020/0378870 A1* | 12/2020 | Wang | G01M 17/06 |

FOREIGN PATENT DOCUMENTS

| JP | H07199820 A | 8/1995 |
| JP | 2017204261 A | 11/2017 |
| JP | 2020075720 A | 5/2020 |
| KR | 20160000346 A | 1/2016 |
| KR | 101609064 B1 | 4/2016 |

* cited by examiner

*Primary Examiner* — Christopher J Kohlman
(74) *Attorney, Agent, or Firm* — STIP Law Group, LLC

(57) ABSTRACT

A system for providing vehicle function guidance and test-driving experience based on augmented reality content according to an embodiment includes: an augmented reality terminal for executing a vehicle description application realizing a vehicle function guidance or test-driving experience providing service on the basis of augmented reality content; a window display device provided on at least two windows including the front side of a vehicle and displaying the augmented reality content; a vehicle speaker for outputting audio according to the augmented reality content; a virtual driving device for providing haptic including predetermined vibration or tilting in the vehicle; and a test-driving experience service providing server for controlling the window display device, the vehicle speaker or the virtual driving device in connection with the vehicle description application.

11 Claims, 8 Drawing Sheets

[FIG. 1]
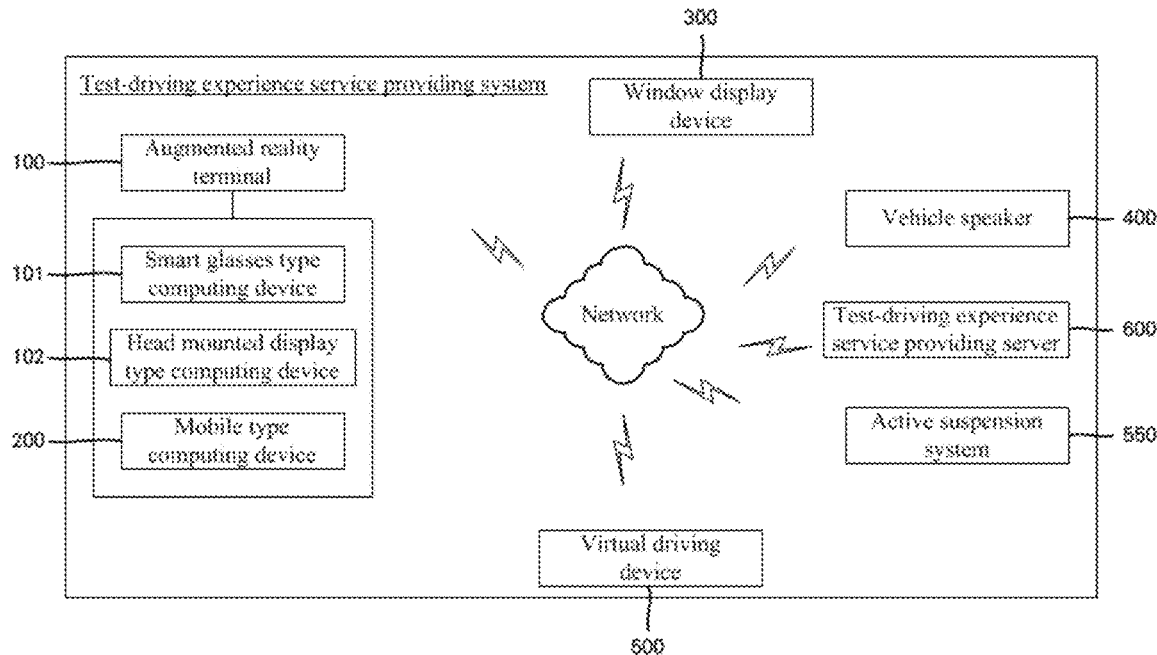
[FIG. 2]
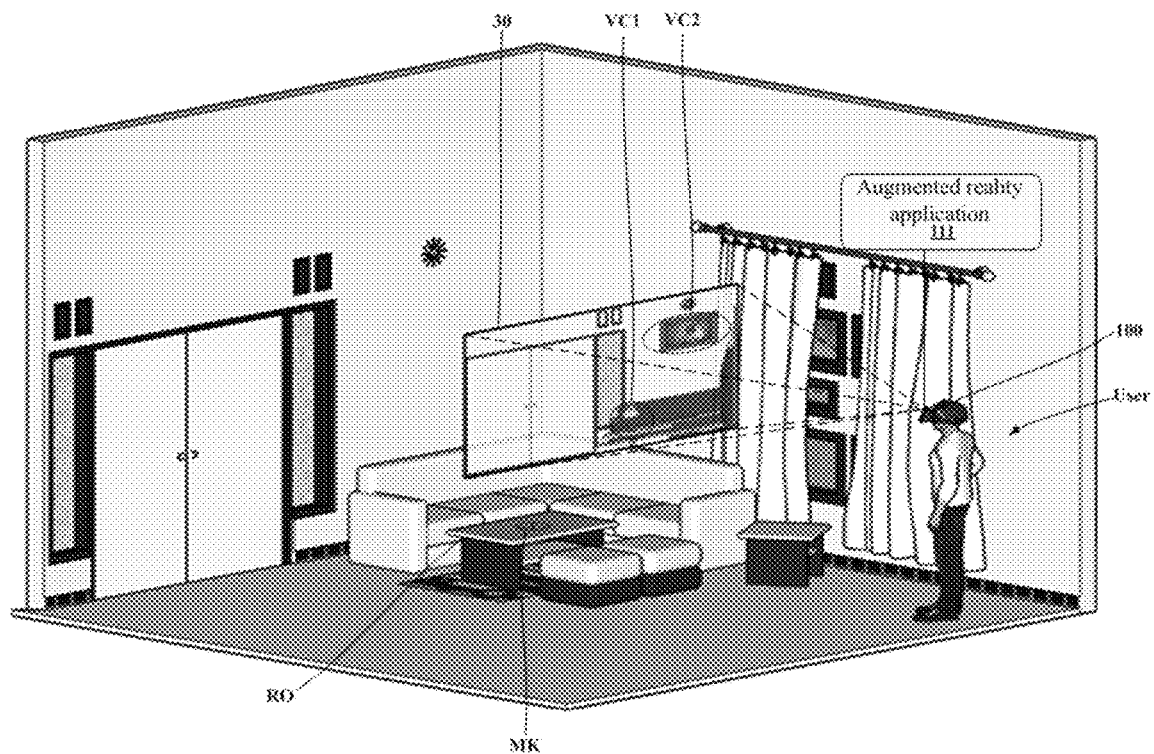

[FIG. 3]
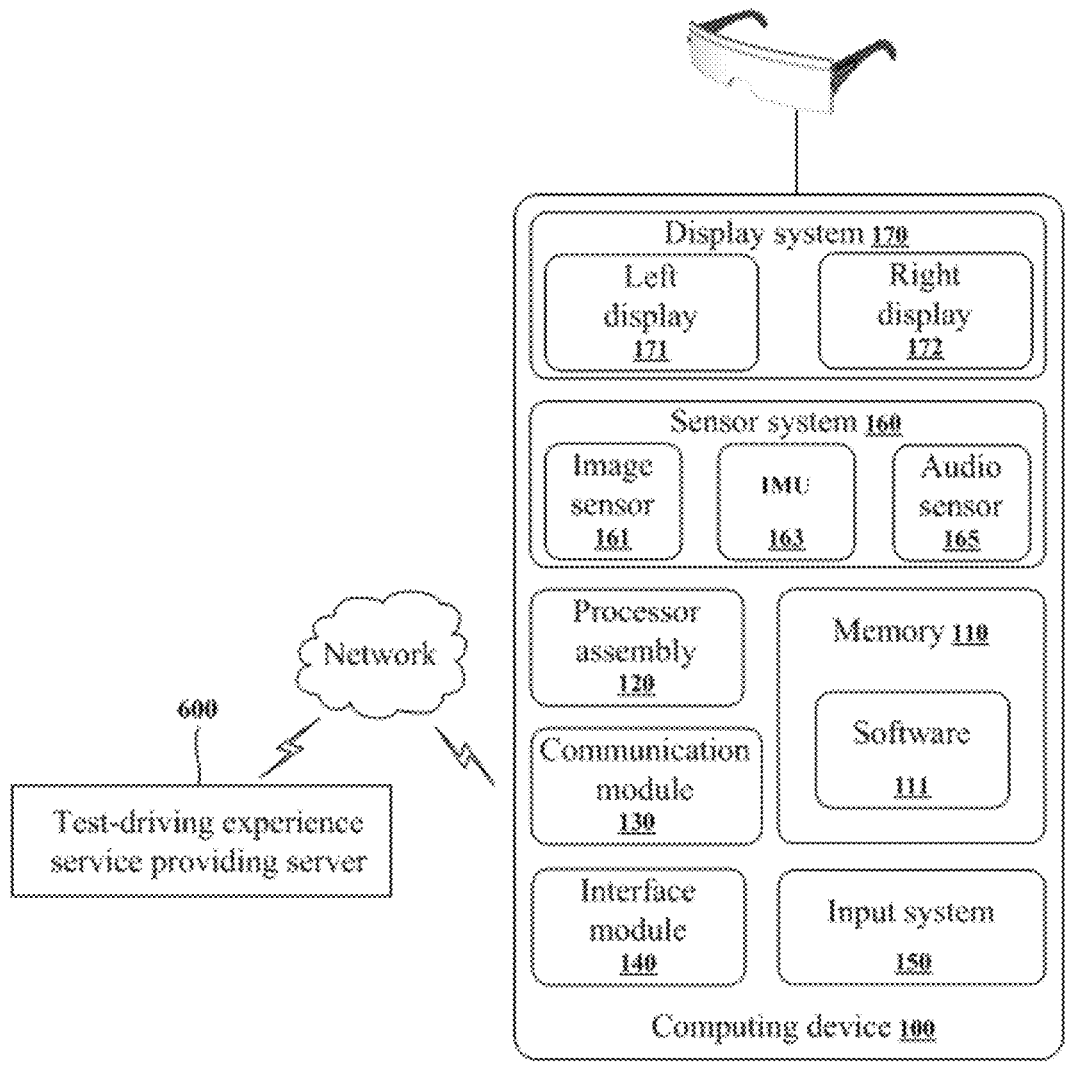

[FIG. 4]
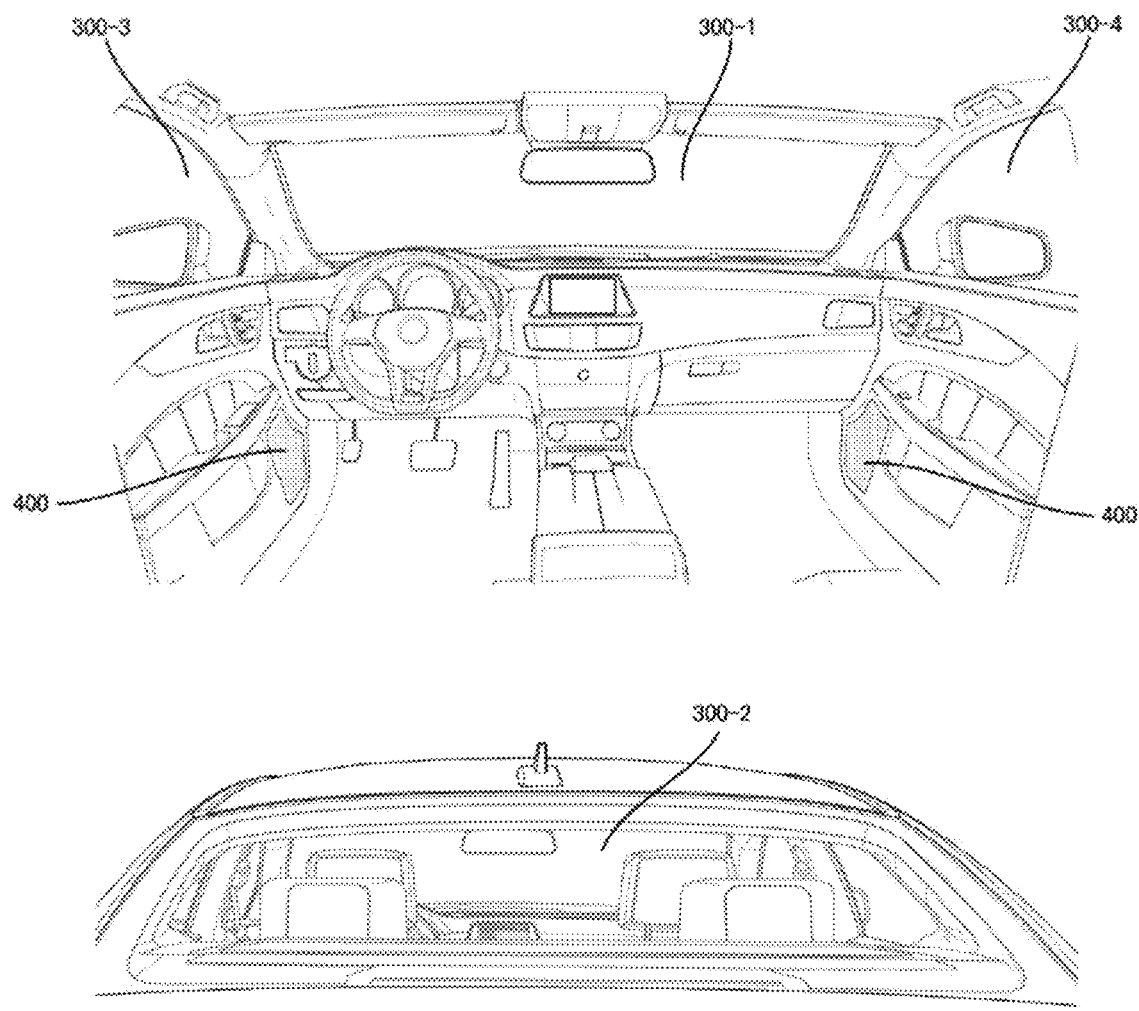

[FIG. 5]
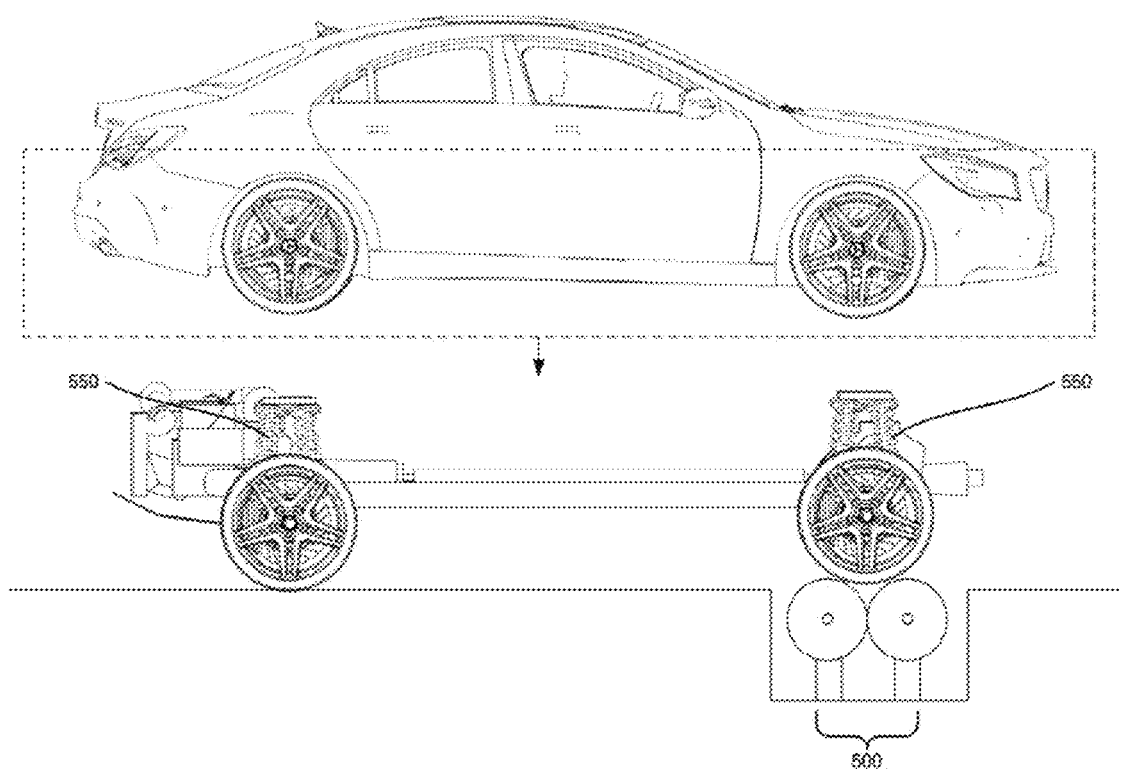
[FIG. 6]
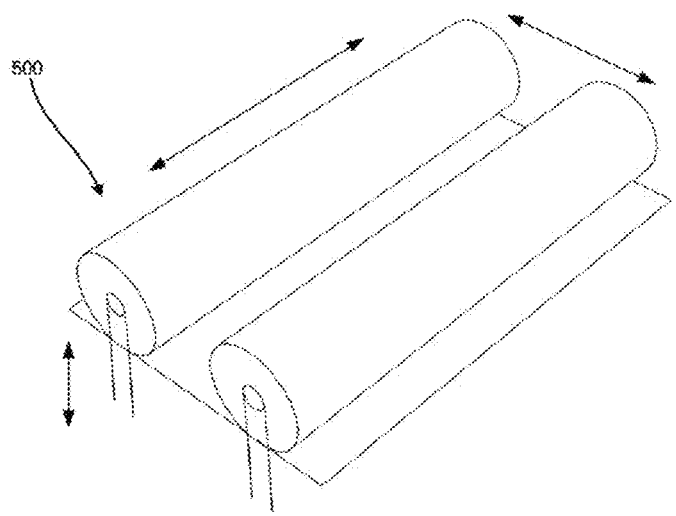

[FIG. 7]
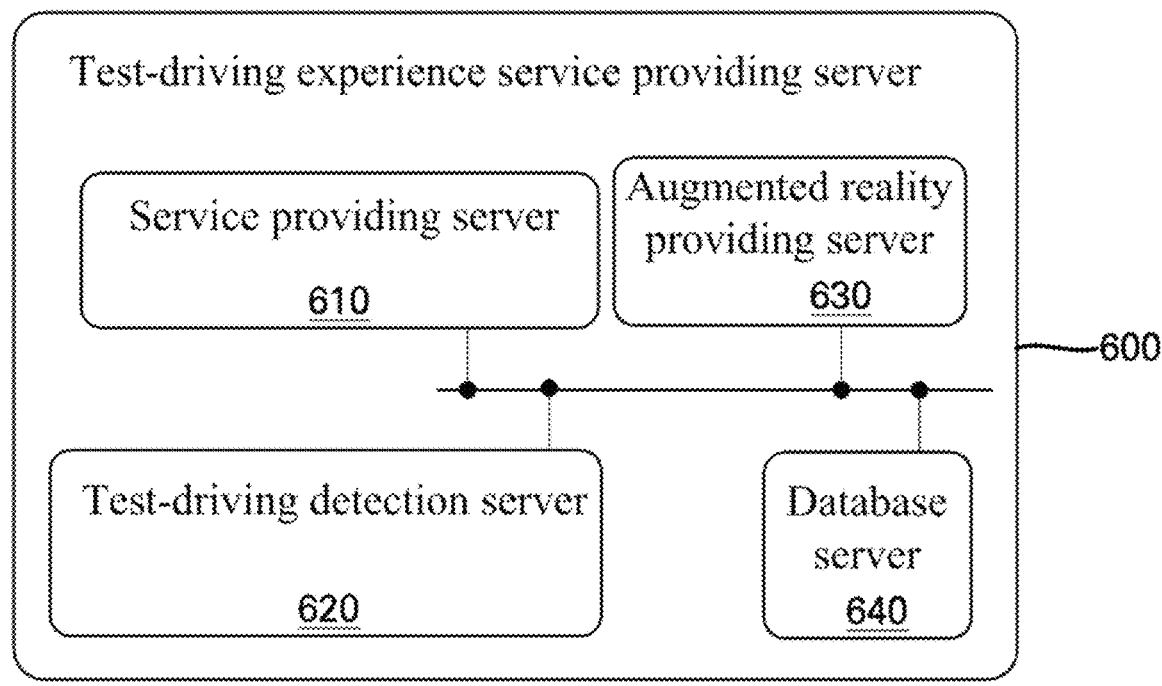

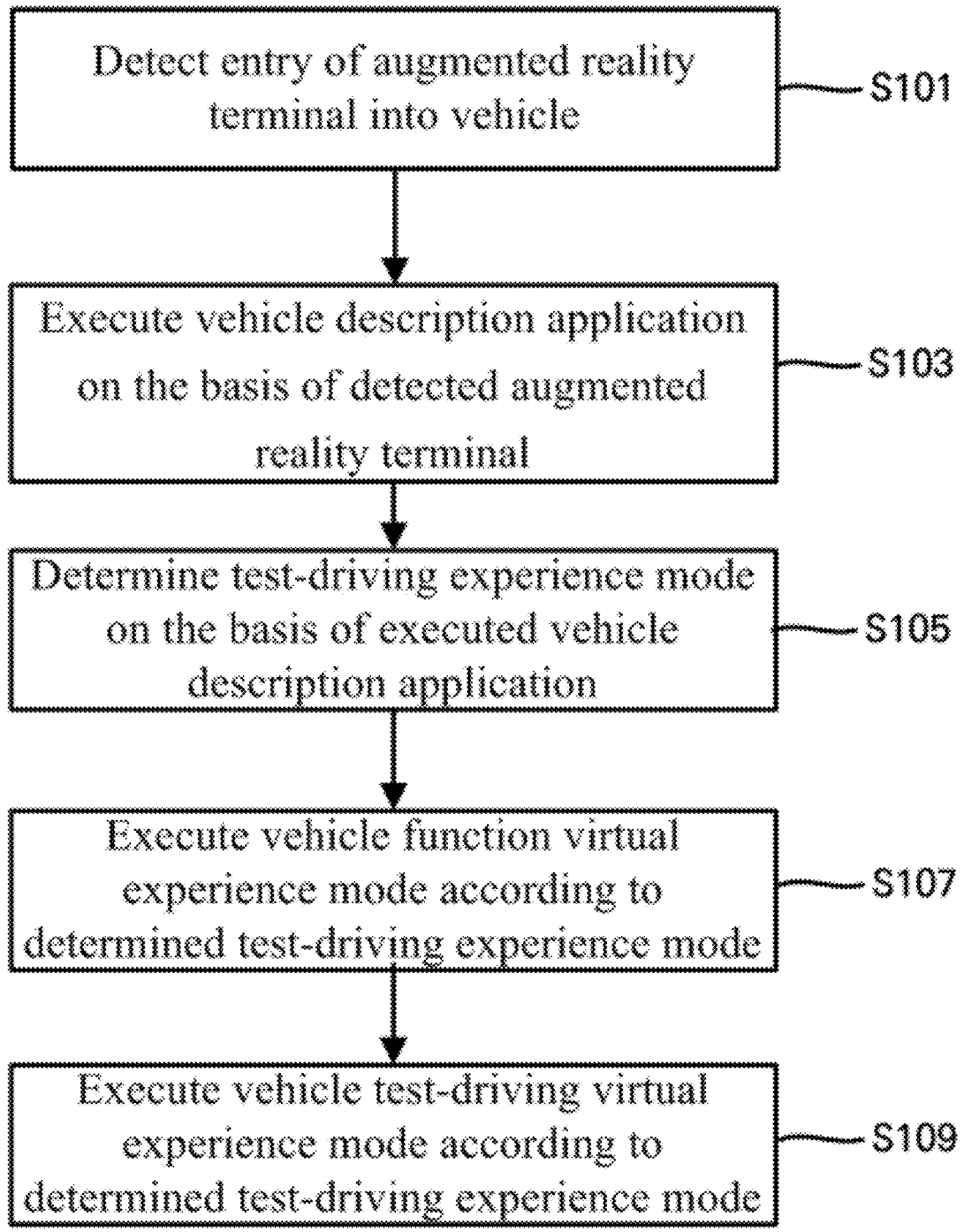
[FIG. 8]

[FIG. 9]
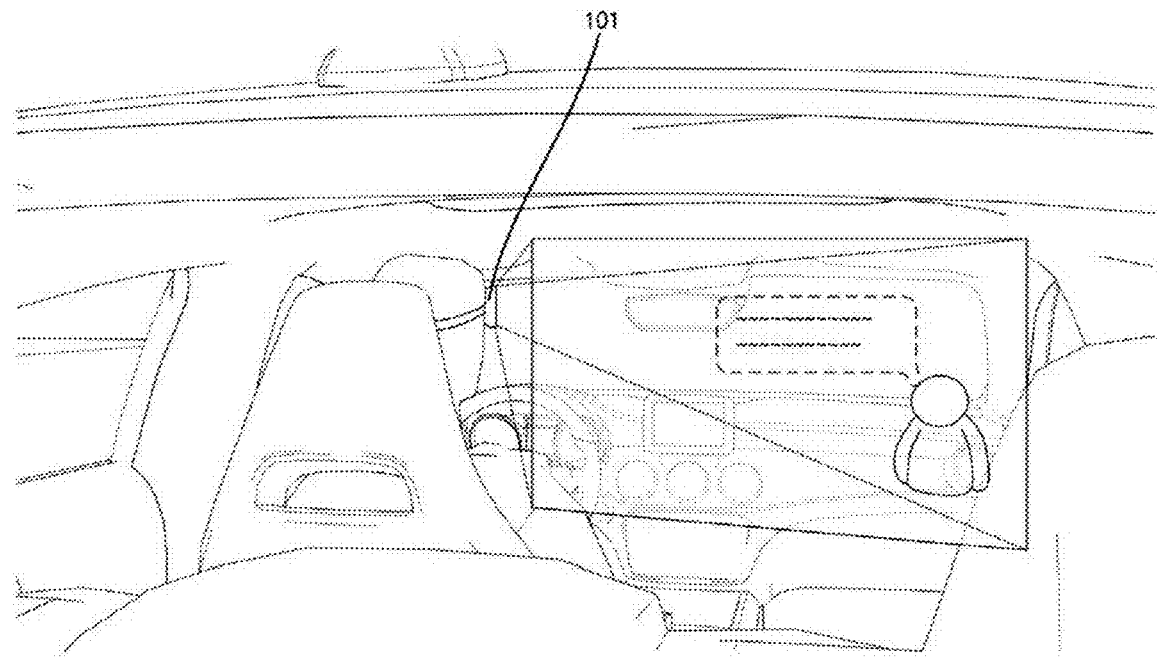
[FIG. 10]
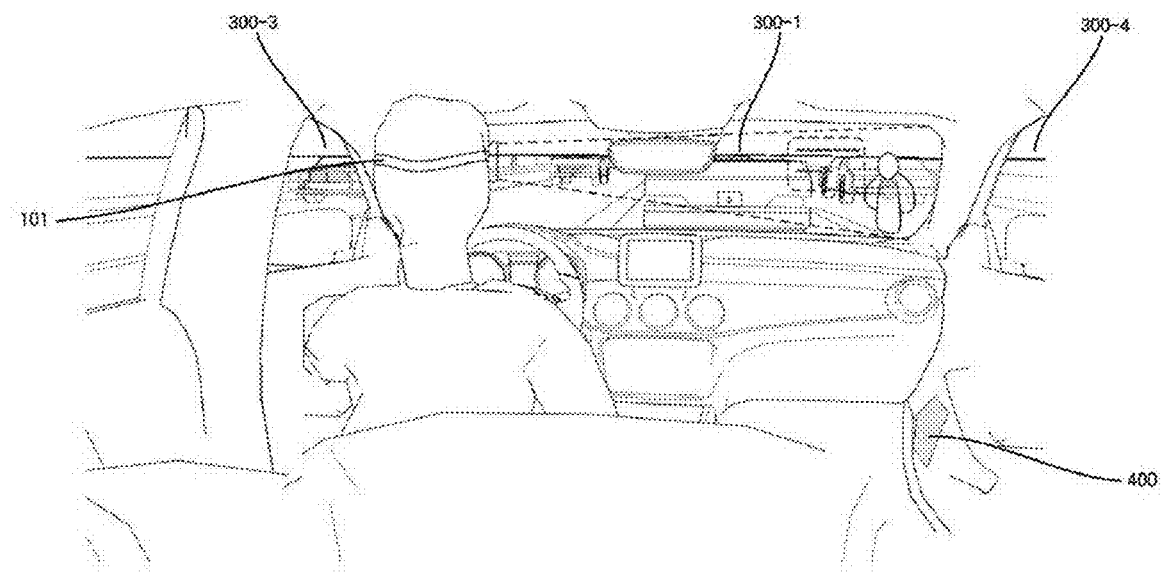

[FIG. 11]
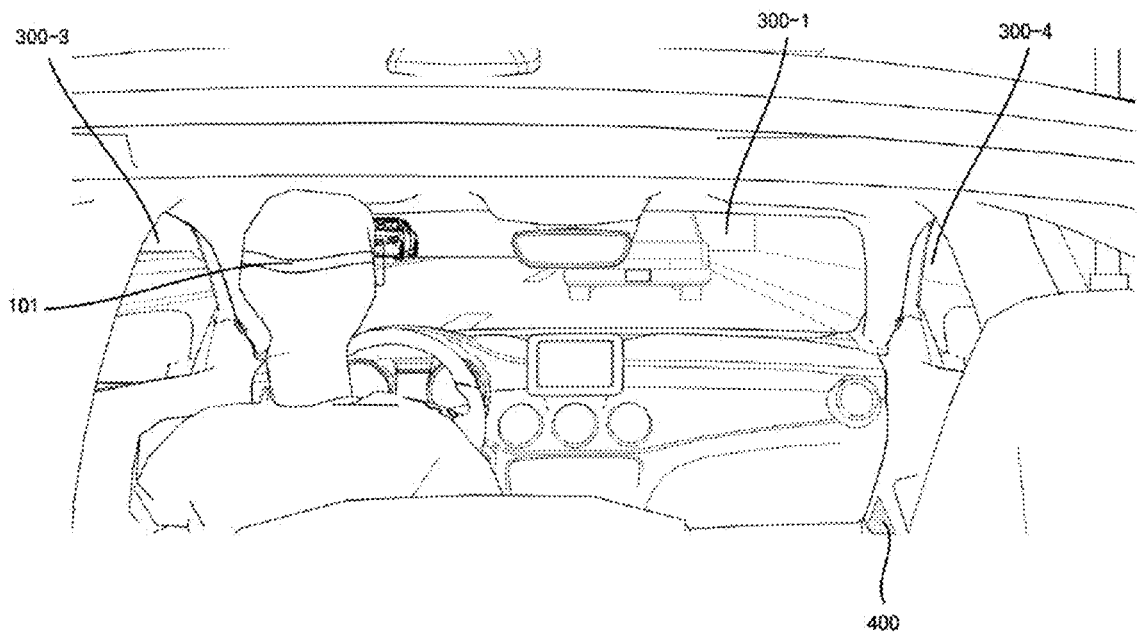
[FIG. 12]
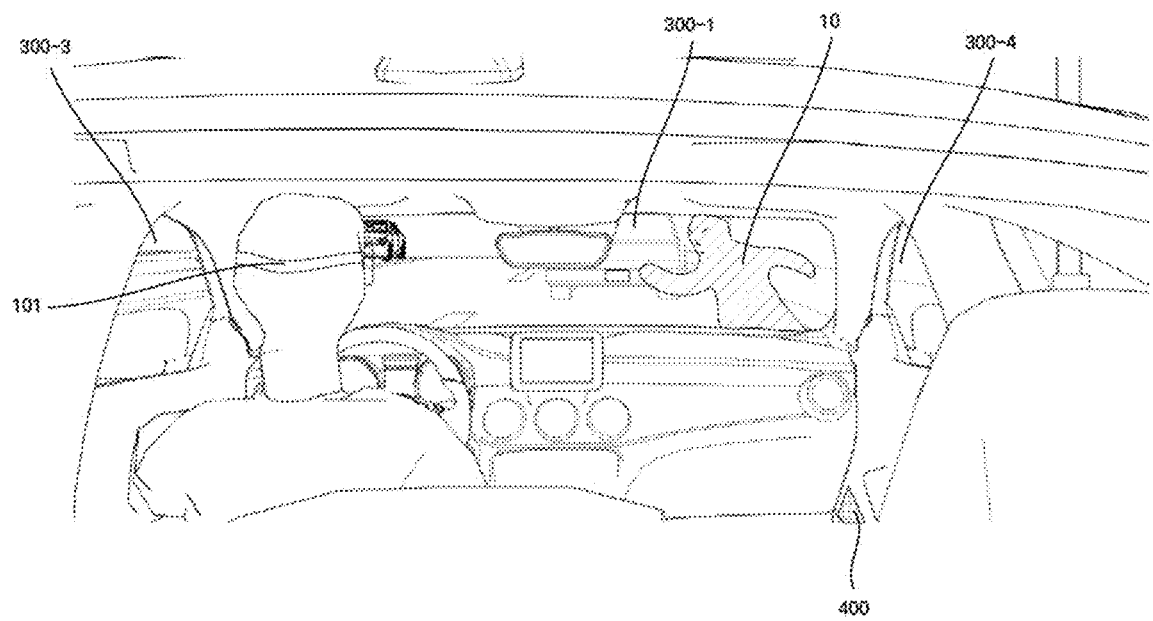

SYSTEM AND METHOD FOR PROVIDING VEHICLE FUNCTION GUIDANCE AND VIRTUAL TEST-DRIVING EXPERIENCE BASED ON AUGMENTED REALITY CONTENT

BACKGROUND OF THE INVENTION

Field of the Invention

The present invention relates to a system and method for providing vehicle function guidance and virtual test-driving experience based on augmented reality content. More specifically, the invention relates to a system and method for explaining vehicle functions and providing virtual test-driving experience on the basis of augmented reality content using a demonstrator vehicle for display.

Related Art

Recently, various technologies for the purpose of convenience of users (drivers) using vehicles (typically, cars) have been developed and introduced with the development of IT.

Particularly, vehicles having a driver assistance function of assisting driving of a user to improve safety and convenience during driving are attracting attention owing to development of various sensors and electronic equipment.

For example, a smart vehicle that provides various functions for safety and convenience of a user (driver) or pedestrians is typical.

A smart vehicle, a high-tech vehicle merged with information technology (IT), is also called a smart car and provides optimal traffic efficiency through introduction of an advanced system into the vehicle and association with an intelligent traffic system (ITS).

For example, a smart vehicle includes core technology related to safety such as obstacle detection and collision detection or reduction, such as an advanced driver assistance system (ADAS), an advanced emergency braking system (AEBS), and adaptive cruise control (ACC), and provides technical advantages of maximizing safety of pedestrians as well as a user (driver).

Such vehicles integrated with the latest technology are displayed in a shop or a showroom such that customers purchase them and product description or test-driving experience with respect to corresponding vehicles is provided to customers.

However, most vehicles displayed in showrooms are manufactured such that they do not actually operate.

That is, a vehicle displayed in a showroom to customers can provide only limited experience of simply checking the appearance of the vehicle or looking around the inside of the vehicle, and thus detailed description of various functions mounted in the vehicle, as described above, is not effectively delivered to customers and it is difficult for customers to understand how functions are used in actual driving situations and vehicle use situations and what kind of utility can be provided by the functions only with simple description of functions.

This causes problems that customers experience vehicles while information about vehicle functions that become increasingly diversified and complicated is not appropriately delivered to the customers so that an experience-purchase conversion rate with respect to a demonstrator vehicle displayed in a showroom may be decreased.

From a different viewpoint, a problem that existing users have distrust of the latest technology (driver assistance function and the like) integrated with vehicles or do not fully understand the driver assistance function and thus cannot properly use functions included in vehicles is generated.

Furthermore, although car salesmen need to provide detailed description of various types of techniques and devices to customers in a vehicle sales process, it is difficult for car salesmen to verbally explain detailed functions of vehicles and it is practically impossible for individual car salesmen to memorize and be well-informed of strong points of all vehicle and explain them to customers.

CITATION LIST

Patent Literature (Patent Literature 1) JP 2017-204261 A

SUMMARY OF THE INVENTION

An object of the present invention devised to solve the above-described problems is to provide a system and method for providing vehicle function description and virtual test-driving experience based on augmented reality content using a general vehicle for display in a showroom (hereinafter, a displayed vehicle).

However, the present invention and technical tasks to be accomplished by embodiments of the present invention are not limited to the aforementioned technical tasks and may include other technical tasks.

A system for providing vehicle function guidance and test-driving experience based on augmented reality content according to an embodiment includes: an augmented reality terminal for executing a vehicle description application realizing a vehicle function guidance or test-driving experience providing service on the basis of augmented reality content; a window display device provided on at least two windows including the front side of a vehicle and displaying the augmented reality content; a vehicle speaker for outputting audio according to the augmented reality content; a virtual driving device for providing haptic including predetermined vibration or tilting in the vehicle; and a test-driving experience service providing server for controlling the window display device, the vehicle speaker or the virtual driving device in connection with the vehicle description application.

Here, the system may further include an active suspension system for providing a predetermined vibrating or tilting effect delivered to the vehicle.

Further, the test-driving experience service providing server may control at least one of the virtual driving device and the active suspension system such that the vibrating or tilting effect corresponding to the augmented reality content is delivered to the vehicle.

Further, when entry of the augmented reality terminal into the vehicle is detected, the test-driving experience service providing server may provide a test-driving experience mode in which functions of the vehicle are experienced using the augmented reality content on the basis of the vehicle description application of the detected augmented reality terminal.

Further, the test-driving experience mode may include a vehicle function virtual experience mode in which guidance of functions of the vehicle is provided on the basis of the augmented reality content and a vehicle test-driving virtual experience mode in which a user enters the vehicle and experiences virtual driving.

Further, the test-driving experience service providing server may execute the vehicle function virtual experience mode to provide guide information about a first vehicle function matching an object sensed by an image sensor of the augmented reality terminal.

Further, the test-driving experience service providing server may control the augmented reality terminal to provide the guide information about the first vehicle function through a virtual avatar based on augmented reality.

Further, the test-driving experience service providing server may execute the vehicle test-driving virtual experience mode to provide a virtual driving environment setting interface by which at least one of a virtual driving parameter and a scenario for setting an environment of the virtual driving on the basis of the vehicle description application is set.

Further, the test-driving experience service providing server may provide a test-driving virtual experience scenario image which is an augmented reality image providing the virtual driving experience environment on the basis of at least one of the set virtual driving parameter and scenario.

Further, when the test-driving virtual experience scenario image is output, the test-driving experience service providing server may include event content related to a second vehicle function in the test-driving virtual experience scenario image and output the test-driving virtual experience scenario image.

Further, the test-driving experience service providing server may provide the test-driving virtual experience scenario image on the basis of at least one of a user input for performing an operation with respect to driving of the vehicle and an input for operation according to automatic activation of the second vehicle function upon output of the event content.

In addition, a method for providing vehicle function guidance and test-driving experience based on augmented reality content in a test-driving experience service providing server includes: detecting entry of an augmented reality terminal into a vehicle; executing a vehicle description application on the basis of the detected augmented reality terminal; providing a test-driving experience mode in which functions of the vehicle are experienced using the augmented reality content on the basis of the executed vehicle description application; executing the determined test-driving experience mode; outputting the augmented reality content on the basis of the executed test-driving experience mode; and providing a predetermined vibrating or tilting effect according to the output augmented reality content to the vehicle.

Here, the executing of the determined test-driving experience mode may include executing a vehicle function virtual experience mode in which guidance of functions of the vehicle is provided on the basis of the augmented reality content or executing a vehicle test-driving virtual experience mode in which a user enters the vehicle and experience virtual driving.

Further, the outputting of the augmented reality content may include providing the augmented reality content on the basis of at least one of a user input for performing an operation with respect to driving of the vehicle and an input for operation according to automatic activation of a function of the vehicle.

As described above, the system and method for providing vehicle function guidance and test-driving experience based on augmented reality content according to embodiments of the present invention have the effect of describing vehicle functions on the basis of augmented reality content using a displayed vehicle such that a user can virtually experience various functions of the vehicle without actually executing the functions.

In addition, the system and method for providing vehicle function guidance and test-driving experience based on augmented reality content according to embodiments of the present invention have the effects of providing virtual test-driving experience on the basis of augmented reality content using a displayed vehicle such that a user can virtually experience various scenario situations during driving through the vehicle as well as simply checking the exterior and the interior of the vehicle and providing vehicle function experience and guidance.

Moreover, the system and method for providing vehicle function guidance and test-driving experience based on augmented reality content according to embodiments of the present invention have the effects of describing vehicle functions and providing virtual test-driving experience on the basis of augmented reality content to improve user's understanding of various functions of the vehicle.

Further, the system and method for providing vehicle function guidance and test-driving experience based on augmented reality content according to embodiments of the present invention have the effects of describing vehicle functions and providing virtual test-driving experience on the basis of augmented reality content to assist a user in selecting a vehicle to be purchased and to increase an experience-purchase conversion rate with respect to a demonstrator vehicle displayed in a sales shop or a showroom.

However, the effects that can be achieved with the present invention are not limited to what has been particularly described hereinabove and other advantages of the present invention will be more clearly understood from the following detailed description.

BRIEF DESCRIPTION OF THE DRAWINGS

FIG. 1 is a conceptual diagram of a system for providing vehicle function guidance and test-driving experience based on augmented reality content according to an embodiment of the present invention.

FIG. 2 illustrates an example of experiencing an augmented reality environment through a wearable type computing device according to an embodiment of the present invention.

FIG. 3 is an internal block diagram of the wearable type computing device according to an embodiment of the present invention.

FIG. 4 is an exemplary diagram for describing a window display device according to an embodiment of the present invention.

FIGS. 5 and 6 are exemplary diagrams for describing a virtual driving device according to an embodiment of the present invention.

FIG. 7 is an internal block diagram of a test-driving experience service providing server according to an embodiment of the present invention.

FIG. 8 is a flowchart for describing a method for providing vehicle function guidance and test-driving experience based on augmented reality content according to an embodiment of the present invention.

FIG. 9 is an exemplary diagram for describing a vehicle function virtual experience mode according to an embodiment of the present invention.

FIG. 10 illustrates an example in which a first vehicle function virtual experience scenario image is displayed through the window display device according to an embodiment of the present invention.

FIG. 11 is an exemplary diagram for describing a test-driving virtual experience mode according to an embodiment of the present invention.

FIG. 12 illustrates an example in which event content related to a second vehicle function is displayed in a test-driving virtual experience scenario image according to an embodiment of the present invention.

DESCRIPTION OF EXEMPLARY EMBODIMENTS

The present invention may be modified in various manners and may have various embodiments, and specific embodiments will be illustrated in drawings and described in detail. The effects and features of the present invention, and methods for accomplishing the same will be apparent with reference to embodiments described in detail later along with the drawings. However, the present invention is not limited to embodiments described below and may be implemented in various manners. In the following embodiments, terms such as "first" and "second" may be used to distinguish any one element from another element. Further, an element described in the singular form is intended to include a plurality of elements unless the context clearly indicates otherwise. In addition, in the specification of the present invention, it will be further understood that the terms "comprise" and "include" specify the presence of stated features or elements, but do not preclude the presence or addition of one or more other features or elements. In the drawings, the sizes of elements may be exaggerated or reduced for convenience of description. For example, the size and thickness of each component are arbitrarily shown in the drawings for convenience of description and thus the present invention is not limited thereto.

Hereinafter, embodiments of the present invention will be described in detail with reference to the attached drawings, and the same or corresponding components will be denoted by the same reference sign and redundant description thereof will be omitted in description with reference to the drawings.

FIG. 1 is a conceptual diagram of a system for providing vehicle function guidance and test-driving experience based on augmented reality content according to an embodiment of the present invention.

Referring to FIG. 1, the system for providing vehicle function guidance and test-driving experience based on augmented reality content (hereinafter, test-driving experience system) according to an embodiment of the present invention may include an augmented reality terminal 100, a window display device 300, a vehicle speaker 400, a virtual driving device 500, and a test-driving experience service providing server 600.

In an embodiment, the augmented reality terminal 100, the window display device 300, the vehicle speaker 400, the virtual driving device 500, and the test-driving experience service providing server 600 may be connected to provide a vehicle function guidance and test-driving experience providing service (hereinafter, test-driving experience service) based on augmented reality content, which provides vehicle function description and virtual test-driving experience based on augmented reality content using a displayed vehicle.

In addition, the components of FIG. 1 may be connected on the basis of a network.

Here, the network is a connecting structure in which nodes such as the augmented reality terminal 100, the window display device 300, the vehicle speaker 400, the virtual driving device 500, and the test-driving experience service providing server 600 can exchange information, and examples of the network include 3GPP (3rd Generation Partnership Project) networks, LTE (Long Term Evolution) networks, WIMAX (World Interoperability for Microwave Access) networks, the Internet, LAN (Local Area Network), Wireless LAN (Wireless Local Area Network), WAN (Wide Area Network), PAN (Personal Area Network), Bluetooth network, satellite broadcast networks, analog broadcast networks, DMB (Digital Multimedia Broadcasting) networks, but the present invention is not limited thereto.

Augmented Reality Terminal 100

In an embodiment of the present invention, the augmented reality terminal 100 provides an augmented reality environment to a user and can execute a vehicle description application capable of providing a test-driving experience service using audio, images and virtual augmented reality content (avatar or the like in the embodiment) corresponding to actual objects in the augmented reality environment.

The augmented reality terminal 100 may include various types (e.g., wearable type, mobile type, etc.) of augmented reality terminal 100 in which the vehicle description application is installed.

1. Wearable Type Computing Devices 101 and 102

FIG. 2 illustrates an example of experiencing an augmented reality environment through wearable type computing devices 101 and 102 according to an embodiment of the present invention and FIG. 3 is an internal block diagram of the wearable type computing devices 101 and 102 according to an embodiment of the present invention.

The augmented reality terminal 100 according to an embodiment may include wearable type computer devices 101 and 102 such as a smart glasses display and a head mounted display (HMD).

The smart glasses type computing device 101 may include a display system having glasses on which augmented reality content is displayed to the visual field of a user while transmitting light such that the user wearing it can view the surrounding physical space.

Specifically, the smart glasses type computing device 101 may include a transparent glass display which transmits light from the surrounding physical space such that the light reaches the eyes of the user and, simultaneously, reflects augmented reality content displayed through a display system to the eyes of the user.

For example, referring to FIG. 2, a vehicle description application 111 of the smart glass type computing device 101 can recognize images of a real object RO and a marker MK on the real object RO in the surrounding physical space and control augmented reality content VC1 such that it is displayed on a visual field 30 of a user which corresponds to the recognized marker MK.

In addition, the vehicle description application 111 can recognize a trained real object and control augmented reality content VC2 such that it is displayed on a visual field of the user which corresponds to the recognized real object.

Further, the vehicle description application 111 can recognize a physical space through the trained real object or marker MK and display augmented reality content matching a specific position of the recognized space such that the augmented reality content corresponds to the visual field of the user.

Such augmented reality content may include visual content such as images or video which can be displayed on a part of the visual field of the user in the smart glasses type computing device 101.

For example, augmented reality content may include virtual object images overlaying various parts of a physical space. These virtual object images may be rendered as 2D images or 3D images.

The head mounted display type computing device 102 can block light projected to the surrounding physical space such that a displayed image can be viewed only through a display system.

The head mounted display type computing device 102 can output a 3D image by respectively displaying different images having a parallax offset on left-eye and right-eye displays in order to allow a user to recognize a 3D scene.

In addition, the head mounted display type computing device 102 can also provide an augmented reality environment by outputting images obtained by imaging the surrounding physical space and augmented reality content generated on the basis of the images as 3D images.

Hereinafter, specific components of the smart glasses type computing device 101 between the aforementioned wearable type computing devices 101 and 102 will be described.

Referring to FIG. 3, the smart glasses type computing device 101 according to exemplary implementation may include a memory 110 including the vehicle description application 111, a processor assembly 120, a communication module 130, an interface module 140, an input system 150, a sensor system 160, and a display system 170. In addition, these components may be implemented such that they are included in the housing of the computing device 101.

The memory 110 stores the vehicle description application 111, and the vehicle description application 111 may include augmented reality content for providing augmented reality environments, an image buffer, a position engine, and an augmented reality content display engine.

That is, the memory 110 can store commands and data that can be used to generate augmented reality environments.

In an embodiment, the vehicle description application 111 may include a communication application for performing communication on the basis of augmented reality environment.

Here, the communication application may include various applications, engines, data and commands for providing the test-driving experience service.

In addition, the memory 110 may include at least one non-transitory computer-readable storage medium and transitory computer-readable storage medium.

For example, the memory 110 may be various storage devices such as a ROM, an EPROM, a flash drive, and a hard drive and may include a web storage that executes a storage function of the memory 110.

The processor assembly 120 may include at least one processor capable of executing commands of the vehicle description application 111 stored in the memory 110 to perform various operations for generating augmented reality environments.

In an embodiment, the processor assembly 120 can control the overall operation of the components through the vehicle description application 111 of the memory 110 in order to provide the test-driving experience service.

For example, the processor assembly 120 can recognize a real object from an image acquired through an image sensor and control the components of the smart glasses type computing device 101 such that the components generate augmented reality images by matching augmented reality content to the recognize real object and display the augmented reality images.

The processor assembly 120 may include a central processing unit (CPU) and/or a graphic processor unit (GPU).

In addition, the processor assembly 120 may include at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electronic units for executing other functions.

The communication module 130 may include one or more devices for communicating with other computing devices (e.g., the test-driving experience service providing server 600 and the like). The communication module 130 can perform communication through a wireless network.

Specifically, the communication module 130 can communicate with computing devices in which augmented reality content sources for realizing augmented reality environments are stored and communicate with various user input components such as a controller which receives user input.

In an embodiment, the communication module 130 can transmit/receive various types of data related to the test-driving experience service to/from the test-driving experience service providing server 600 and/or other augmented reality terminals 100.

The communication module 130 can wirelessly transmit/receive data to/from at least one of base stations, external terminals and arbitrary servers in a mobile communication network constructed through communication devices which can perform technology standards or communication schemes (e.g., LTE (Long Term Evolution), LTE-A (Long Term Evolution-Advanced), 5G NR (New Radio) and WIFI) or short-range communication methods.

The sensor system 160 may include various sensors such as an image sensor 161, a position sensor (IMU) 163, an audio sensor, a distance sensor, a proximity sensor, and a contact sensor.

The image sensor 161 can capture images and/or video with respect to the physical space surrounding the smart glasses type computing device 101.

In an embodiment, the image sensor 161 can capture and acquire images with respect to the test-driving experience service.

In addition, the image sensor 161 may be provided on the front side and/or the rear side of the smart glasses type computing device 101 to perform imaging in the direction in which it is disposed to acquire images and may image physical spaces such as work sites through a camera disposed toward the outside of the smart glasses type computing device 101.

The image sensor 161 may include an image sensor 161 and an image processing module. Specifically, the image sensor 161 can process still images or moving images acquired by the image sensor 161 (e.g., a CMOS or a CCD).

Further, the image sensor 161 can process a still image or a moving image acquired through the image sensor 161 using the image processing module to extract necessary information and transmit the extracted information to a processor.

The image sensor 161 may be a camera assembly including at least one camera. The camera assembly may include a general camera that images a visible-light band and may further include special cameras such as an infrared camera and a stereo camera.

The IMU 163 can detect at least one of a motion and an acceleration of the smart glasses type computing device 101. For example, the IMU 163 may be composed of a combination of various position sensors such as an accelerometer, a gyroscope and a magnetometer. In addition, the IMU 163 may recognize space information about the physical space surrounding the smart glasses type computing device 101 in connection with a position communication module 130 such as a GPS of the communication module 130.

Further, the IMU 163 can detect information for detecting and tracking a visual-line direction and a head motion of a user on the basis of detected positions and directions.

In some implementations, the vehicle description application 111 can determine a position and a direction of a user in a physical space or recognize features or objects in the physical space using the IMU 163 and the image sensor 161.

The audio sensor 165 can recognize sound around the smart glasses type computing device 101.

Specifically, the audio sensor 165 may include a microphone capable of detecting audio input of a user of the smart glasses type computing device 101.

In an embodiment, the audio sensor 165 may receive audio data to be transmitted through the test-driving experience service from the user.

The interface module 140 can connect the smart glasses type computing device 101 to one or more other devices such that they can communicate. Specifically, the interface module 140 may include wired and/or wireless communication devices compatible with one or more different communication protocols.

The smart glasses type computing device 101 can be connected to various input/output devices through the interface module 140.

For example, the interface module 140 may be connected to an audio output device such as a headset port or a speaker to output audio.

Although an example in which an audio output device is connected through the interface module 140 has been described, an embodiment in which the audio output device is provided in the smart glasses type computing device 101 may also be included in the present invention.

The interface module 140 may include at least one of a wired/wireless headset port, an external charger port, a wired/wireless data port, a memory card port, a port for connecting devices including identification modules, an audio input/output (I/O) port, a video I/O port, an earphone port, a power amplifier, an RF circuit, a transceiver, and other communication circuits.

The input system 150 can detect user input (e.g., a gesture, an audio command, a button operation or other types of input) related to the test-driving experience service.

Specifically, the input system 150 may include buttons, a touch sensor and the image sensor 161 that receives user motion input.

In addition, the input system 150 may be connected to an external controller through the interface module 140 to receive user input.

The display system 170 may include a transparent glass display which transmits light from the physical space surrounding the smart glasses type computing device 101 such that the light reaches the eyes of a user and, simultaneously, reflects augmented reality content displayed through the display system 170 to the eyes of the user.

The display system 170 may include a left display 171 corresponding to the left eye of a user wearing the smart glasses type computing device 101 and a right display 172 corresponding to the right eye of the user, and the left display 171 and the right display 172 may display different images having a parallax offset as augmented reality content such that the user can recognize the augmented reality content as a 3D image.

In an embodiment, the display system 170 can output various types of information related to the test-driving experience service as graphic images.

Such a display may include at least one of a liquid crystal display (LCD), a thin film transistor-liquid crystal display (TFT LCD), an organic light-emitting diode (OLED), a flexible display, a 3D display, and an e-ink display.

2. Mobile Type Computing Device 200

In another example, the augmented reality terminal 100 may be a mobile device such as a smartphone or a tablet PC in which a vehicle description application is installed. Such a mobile type computing device 200 can capture images of the surrounding physical space using an image sensor and display the captured images and augmented reality content matching the physical space through a display system to provide augmented reality environments to users.

For example, the mobile type computing device 200 may include a smartphone, a cellular phone, a digital broadcast terminal, personal digital assistants (PDA), a portable multimedia player (PMP), a tablet PC, and the like.

Specifically, the vehicle description application of the mobile type computing device 200 can capture images of a real object RO and a marker MK in the surrounding physical space 20 and control the display system to display the images. In addition, the vehicle description application can control augmented reality content VC1 to be displayed at a position corresponding to the recognized marker MK. Further, the vehicle description application can learn and recognize a specific real object and control augmented reality content VC2 such that it is displayed on a visual field of a user which corresponds to the position of the recognized specific real object.

Meanwhile, the mobile type computing device 200 according to exemplary implementation may include a memory, a processor assembly, a communication module, an interface module, an input system, a sensor system, and a display system. These components may be configured such that they are included in the housing of the mobile type computing device 200.

Redundant description of the aforementioned components of the mobile type computing device 200 will be replaced with description of the components of the wearable type computing devices 101 and 102, and the following description will focus on differences from the wearable type computing devices 101 and 102.

The aforementioned components can be arranged in the housing of the mobile type computing device 200, and a user interface can include a touch sensor on a display configured to receive touch input of a user.

Specifically, the display system may include a display for displaying images and a touch sensor for sensing touch input of a user.

For example, the display may be implemented as a touch screen by forming a layered structure with the touch sensor or being integrated with the touch sensor. The touch screen can serve as a user input unit which provides an input interface between the mobile type computing device 200 and a user and, simultaneously, provide an output interface between the mobile type computing device 200 and the user.

In addition, the sensor system may include image sensors, and the image sensors may be arranged, for example, on one side and the other side of the housing of the mobile type computing device 200.

Here, the image sensor on one side can capture an image of a physical space by being arranged to face the physical space and the image sensor on the other side can capture a visual field and a gesture of a user by being arranged to face the user.

However, the components illustrated in FIGS. 2 and 3 are not essential for implementation of the augmented reality terminal 100 in embodiments of the present invention, and the augmented reality terminal 100 described in the present specification may include more or fewer components than the aforementioned components.

The augmented reality terminal 100 providing the test-driving experience service based on augmented reality content will be described on the basis of the smart glasses type computing device 101 (hereinafter, smart glasses) in the following embodiments, but the present invention is not limited thereto.

Window Display Device 300

FIG. 4 is an exemplary diagram for describing the window display device 300 according to an embodiment of the present invention.

Referring to FIG. 4, the window display device 300 may be a screen device provided on front, rear, left and right windows of a displayed vehicle in an embodiment of the present invention.

For example, the window display device 300 may include a first window display device 300-1 provided on the front side of the vehicle, a second window display device 300-2 provided on the rear side of the vehicle, a third window display device 300-3 provided on the left side of the vehicle, and a fourth window display device 300-4 provided on the right side of the vehicle.

The window display device 300 can output various types of information related to the test-driving experience service as graphic images.

In an embodiment, the window display device 300 can provide various types of augmented reality content necessary for the test-driving experience service by displaying the same.

The window display device 300 may include at least one of a liquid crystal display (LCD), a thin film transistor-liquid crystal display (TFT LCD), an organic light-emitting diode (OLED), a flexible display, a 3D display and an e-ink display.

Vehicle Speaker 400

In an embodiment of the present invention, the vehicle speaker 400 can output various types of audio data related to the test-driving experience service.

In an embodiment, the vehicle speaker 400 can execute a function of reproducing an audio signal output from a displayed vehicle or controlling an audio signal such as speech input through an internal/external microphone (MIC).

Specifically, the vehicle speaker 400 can output audio data matching augmented reality content (augmented reality image) output through the window display device 300 of the displayed vehicle to provide the audio data to the user in an embodiment.

Virtual Driving Device 500

FIGS. 5 and 6 are exemplary diagrams for describing the virtual driving device 500 according to an embodiment of the present invention.

Referring to FIGS. 5 and 6, the virtual driving device 500 may be a device that provides predetermined vibrating and/or tilting effects to the corresponding displayed vehicle in order to realize a more realistic driving feeling when virtual driving based on augmented reality content is performed in the test-driving experience service using the displayed vehicle in an embodiment of the present invention.

Specifically, the virtual driving device 500 may be implemented in the form of a cylindrical roller having a predetermined length in an embodiment.

In addition, the virtual driving device 500 may be provided at points at which front and/or rear wheels of the displayed vehicle come into contact with the ground in an embodiment.

Further, the virtual driving device 500 can perform predetermined rolling, tilting and/or piston (up-and-down motion) operations according to rotation of wheels in contact therewith to provide a more realistic virtual driving environment when virtual driving is performed in the test-driving experience service.

The virtual driving device 500 can operate in connection with an active suspension system 550 in an embodiment.

Here, the active suspension system 550, which is a device of a vehicle, may be a system that maximizes an electronic control function to absorb shock generated from the surface of a road such that the shock is not delivered to the vehicle body or a user (driver) in the vehicle body.

Although the active suspension system 550 is generally used for the purpose of improving ride comfort and safety of the vehicle, a motion according to a shock absorber, a spring and/or a suspension arm of the active suspension system 550 can be controlled in order to provide a more realistic driving feeling in an embodiment of the present invention.

Test-Driving Experience Service Providing Server 600

The test-driving experience service providing server 600 according to an embodiment of the present invention can perform a series of processes for providing the test-driving experience service.

Specifically, the test-driving experience service providing server 600 can provide the test-driving experience service by exchanging necessary data with the augmented reality terminal 100 in order to cause the vehicle description application 111 to be executed in the augmented reality terminal 100.

More specifically, the test-driving experience service providing server 600 can provide an environment in which the vehicle description application 111 can be executed in the augmented reality terminal 100 in an embodiment.

In addition, the test-driving experience service providing server 600 can determine whether conditions for performing a test-driving experience service process have been satisfied.

Specifically, the test-driving experience service providing server 600 can detect whether a user (driver) has entered a displayed vehicle in an embodiment.

Upon determining that the user has entered the displayed vehicle, the test-driving experience service providing server 600 can cause a test-driving experience service process based on augmented reality using the displayed vehicle to be performed.

Further, the test-driving experience service providing server 600 can provide various types of augmented reality content (augmented reality images) related to the test-driving experience service in an embodiment.

In addition, the test-driving experience service providing server 600 can collect and manage various types of data necessary for the test-driving experience service in an embodiment.

FIG. 7 is an internal block diagram of the test-driving experience service providing server 600 according to an embodiment of the present invention.

More specifically, referring to FIG. 7, the test-driving experience service providing server 600 may include a service providing server 610, a test-driving detection server 620, an augmented reality providing server 630, and a database server 640.

Here, the aforementioned components may be implemented as devices separate from the test-driving experience service providing server 600 or may be included in the test-driving experience service providing server 600 according to an embodiment. Although description will be given on the assumption that each component is included in the test-driving experience service providing server 600, the present invention is not limited thereto.

Specifically, the test-driving experience service providing server 600 can provide an environment in which the vehicle description application 111 can be executed in the augmented reality terminal 100.

That is, the service providing server 610 can provide an environment in which the vehicle description application 111 that provides the test-driving experience service based on augmented reality content can be executed in the augmented reality terminal 100.

To this end, the service providing server 610 may include an application program, data and/or commands for implementing the vehicle description application 111.

In addition, the test-driving detection server 620 can determine whether a user (driver) has entered a displayed vehicle.

Specifically, the test-driving detection server 620 may include a predetermined sensor system.

Here, the sensor system may include various sensors for sensing various types of information (e.g., whether an object is detected and/or information on a distance to a detected object) about a specific physical space.

In an embodiment, this sensor system may be included in a displayed vehicle and/or the augmented reality terminal 100 or may be provided at a predetermined position at which the sensor system can easily detect the displayed vehicle and/or the augmented reality terminal 100.

For example, the sensor system may include a position sensor, a distance sensor, a proximity sensor, a contact sensor, an optical sensor and/or an image sensor provided in the displayed vehicle and/or the augmented reality terminal 100.

In an embodiment, the test-driving detection server 620 including the sensor system can ascertain whether the augmented reality vehicle 100 has entered the displayed vehicle on the basis of the sensor system in connection with the augmented reality terminal 100.

Accordingly, the test-driving detection server 620 can determine whether a user (driver) carrying the augmented reality terminal 100 has entered the corresponding displayed vehicle.

In addition, the augmented reality providing server 630 can provide augmented reality content necessary for the test-driving experience service.

In an embodiment, the augmented reality providing server 630 may provide an augmented reality avatar image, a first vehicle function virtual experience scenario image, a test-driving virtual experience scenario image and/or responsive test-driving virtual images.

In addition, the database server 640 can store and manage various application programs, applications, commands and/or data for realizing the test-driving experience service.

In an embodiment, the database server 640 may store and manage augmented reality based virtual experience scenario information preset according to vehicle driving conditions in a virtual environment.

Meanwhile, the test-driving experience service providing server 600 including the aforementioned components may be composed of at least one service providing server 610, test-driving detection server 620, augmented reality providing server 630 and/or database server 640 and may include processors for data processing and memories storing commands for providing the test-driving experience service.

Although the test-driving experience service providing server 600 provides an environment in which the vehicle description application 111 can be executed, determines whether conditions for performing a test-driving experience service process have been satisfied, provides various types of augmented reality content (augmented reality images) related to the test-driving experience service, and collects and manages various types of data necessary for the test-driving experience service in an embodiment of the present invention, various embodiments including an embodiment in which some of the functions executed by the test-driving experience service providing server 600 may be executed by the augmented reality terminal 100 can also be provided.

Method for Providing Vehicle Function Guidance and Test-Driving Experience Based on Augmented Reality Content Hereinafter, a method for providing vehicle function guidance and virtual vehicle driving experience based on augmented reality content in a test-driving experience system according to an embodiment of the present invention will be described in detail with reference to FIGS. 8 to 12.

FIG. 8 is a flowchart for describing the method for providing vehicle function guidance and virtual vehicle driving experience based on augmented reality content according to an embodiment of the present invention.

Referring to FIG. 8, the test-driving experience system according to an embodiment of the present invention may detect whether the augmented reality terminal 100 enters a displayed vehicle (S101).

Specifically, the test-driving experience system can determine whether the augmented reality terminal 100 has entered the displayed vehicle through a sensor system provided in the displayed vehicle and/or the augmented reality terminal 100 (smart glasses type computing device in an embodiment) in an embodiment.

More specifically, the test-driving experience system can determine whether the smart glasses type computing device 101 (hereinafter, smart glasses) has entered the corresponding displayed vehicle using a position sensor, a distance sensor, a proximity sensor, a contact sensor, an optical sensor and/or an image sensor provided in the displayed vehicle and the smart glasses 101 in an embodiment.

Accordingly, the test-driving experience system can detect whether a user (i.e., driver) wearing the smart glasses 101 has entered the displayed vehicle.

In addition, the test-driving experience system may execute the vehicle description application 111 through the detected augmented reality terminal 100 upon detecting entry of the augmented reality terminal 100 into the displayed vehicle (S103).

Specifically, the test-driving experience system can execute the vehicle description application 111 installed in the detected smart glasses 101 that has entered the displayed vehicle.

Here, the executed vehicle description application 111 can provide augmented reality based guide (description) information about the displayed vehicle.

That is, the test-driving experience system can execute the vehicle description application 111 installed in the smart glasses 101 of the user in the displayed vehicle to provide the test-driving experience service with respect to the displayed vehicle.

Specifically, the test-driving experience system can determine a test-driving experience mode on the basis of the executed vehicle description application 111 (S105) in an embodiment.

Here, test-driving experience modes according to an embodiment may include a vehicle function virtual experience mode in which a user can be informed of vehicle functions on the basis of augmented reality content and a vehicle test-driving virtual experience mode in which a user can enter a corresponding vehicle and experience virtual driving.

Specifically, the vehicle function virtual experience mode is a service providing guide (description) information about vehicle functions based on augmented reality content, which can virtually perform various functional operations of a vehicle and provide augmented reality images matching the operations through the window display device 300 provided on the front, rear, left and right windows of the vehicle in an embodiment.

Further, the vehicle function virtual experience mode can also provide a virtual driving experience service with respect to a specific function of the vehicle in an embodiment.

In an embodiment, the vehicle test-driving virtual experience mode is a service that substitutes an actual vehicle test-driving service with a virtual environment, and when a user enters a parked displayed vehicle and selects the vehicle test-driving virtual experience mode, can display virtual realistic driving images through the window display device 300 provided on the front, rear, left and right windows of the displayed vehicle.

Accordingly, the vehicle test-driving virtual experience mode can provide realistic virtual experience as if a user in the displayed vehicle actually drives the vehicle.

Here, in an embodiment, the aforementioned virtual realistic driving images may be provided on the basis of a scenario in various actual vehicle driving situations and may be provided additionally including a scenario in which a specific vehicle function is used in such various vehicle driving situations.

Specifically, the test-driving experience system can provide a user interface (hereinafter, test-driving experience mode selection interface) through which a test-driving experience mode can be selected on the basis of the executed vehicle description application 111 in an embodiment.

In addition, the test-driving experience system can determine a test-driving experience mode to be executed using the corresponding displayed vehicle on the basis of user input through the provided test-driving experience mode selection interface.

In this manner, the test-driving experience system according to an embodiment can provide function instruction and experience with respect to a vehicle to a user (customer) on the basis of IT and augmented reality content using a general vehicle displayed in a car sales shop or a showroom so that the user can experience realistic vehicle driving only by getting in a displayed vehicle without being restricted by the actual environment.

Accordingly, the test-driving experience system can realize the effects of improving user (customer) satisfaction and increasing sales according to realistic vehicle experience based on augmented reality content.

Here, the test-driving experience system according to an embodiment can execute the vehicle function virtual experience mode according to the determined test-driving experience mode (S107).

Specifically, when the vehicle function virtual experience mode is determined as a test-driving experience mode through the aforementioned test-driving experience mode selection interface, the test-driving experience system can execute the determined vehicle function virtual experience mode.

In addition, upon execution of the vehicle function virtual experience mode, the test-driving experience system according to an embodiment can provide guide (description) information about a predetermined first vehicle function.

Here, guide information according to an embodiment may include basic information (e.g., basic function description and/or usage) about the first vehicle function, the position of a user interface through which on/off and/or parameter setting for the first vehicle function can be performed and/or usage information.

For example, the first vehicle function may include ADAS (Advanced Driver Assistance Systems), AEBS (Advanced Emergency Braking System), ACC (Adaptive Cruise Control or Smart Cruise Control) and/or LKAS (Lane Keeping Assist System) functions.

More specifically, the test-driving experience system can provide guidance of the first vehicle function by executing the first vehicle function (e.g., ADAS) in a virtual environment.

Here, the test-driving experience system according to an embodiment can provide guidance of the first vehicle function using a virtual avatar realized with augmented reality content.

More specifically, the test-driving experience system may generate and/or acquire and construct augmented reality content based scenario information about a specific object (first vehicle function) in a vehicle in advance for each specific object (first vehicle function).

For example, the test-driving system can generate scenario information that provides guide information about the ADAS function of a vehicle by matching it to the ADAS function and/or an operation button that provides trigger for the ADAS function in advance and manages the scenario information.

In addition, the test-driving experience system can provide augmented reality content in which a virtual avatar based on augmented reality explains the guide information about the first vehicle function through images and/or audio according to the scenario information set in advance and matched to each specific object in the vehicle (first vehicle function) in an embodiment.

Specifically, the test-driving experience system can display a virtual avatar realized in a predetermined shape according to scenario information matched to a specific object (first vehicle function) sensed by the image sensor 161 of the smart glasses 101 in an embodiment.

Here, the test-driving experience system may display the virtual avatar providing the guide information about the first vehicle function using a display unit of the smart glasses 101 that has entered the corresponding displayed vehicle and/or the window display device 300.

Description will be given below on the assumption that the test-driving experience system displays and provides a virtual avatar through the display system 170 of the smart glasses 101, but the present invention is not limited thereto.

That is, the test-driving experience system can provide guide information preset corresponding to the first vehicle function by displaying a virtual avatar based on augmented reality on the basis of scenario information matched to the specific object (first vehicle function) sensed by the image sensor 161 of the smart lasses 101, that is, the specific object (first vehicle function) positioned in a region viewed by a user (driver).

For example, in a case where the image sensor 161 of the smart glasses 101 faces an ADAS (Advance Driver Assistance System) execution button (object), the test-driving experience system can provide guide information about the ADAS execution button (e.g., basic function description and/or usage of the ADAS function) through a virtual avatar realized in a predetermined shape according to predetermined scenario information matched to the ADAS execution button.

In this manner, the test-driving experience system can provide description of vehicle functions through a displayed vehicle with augmented reality content such that a user can more easily recognize and systematically learn many vehicle functions that become increasingly diversified and complicated.

Furthermore, the test-driving experience system can provide a virtual experience mode with respect to the first vehicle function upon execution of the vehicle function virtual experience mode in an embodiment.

Specifically, the test-driving experience system can provide a user interface through which execution of the virtual experience mode with respect to the first vehicle function can be selected on the basis of the vehicle description application 111 executed in the smart glasses 101.

In addition, the test-driving experience system can execute a first vehicle function virtual experience mode in which augmented reality content through which a user can virtually experience the first vehicle function is provided on the basis of user input (user gesture or the like) through the user interface provided as above.

FIG. 10 illustrates an example in which a first vehicle function virtual experience scenario image is displayed on the window display device 300 according to an embodiment of the present invention.

Specifically, referring to FIG. 10, the test-driving experience system according to an embodiment can display a virtual experience scenario image with respect to the first vehicle function using the window display device 300 provided on the front, rear, left and right windows of the displayed vehicle upon execution of the first vehicle function virtual experience mode.

Here, the first vehicle function virtual experience scenario image is an augmented reality image constructed on the basis of scenario information generated in advance matching the first vehicle function and may be an image providing a virtual environment in which a user can virtually experience the first vehicle function.

For example, the first vehicle function virtual experience scenario image may display a virtual driving situation through the window display device 300 and may be generated in advance such that it additionally includes a situation in which the first vehicle function is executed in the virtual driving situation and provided.

Here, the test-driving experience system may provide a sound effect corresponding to the first vehicle function virtual experience scenario image in connection with the vehicle speaker 400.

For example, in a case where a collision between vehicles occurs in the first vehicle function virtual experience scenario image, the test-driving experience system can output audio data corresponding to the collision scenario through the vehicle speaker 400.

In addition, the test-driving experience system may deliver effects such as vibration, tilting and/or shock corresponding to the first vehicle function virtual experience scenario image to the corresponding displayed vehicle in connection with the active suspension system 550 and/or the virtual driving device 500.

In an embodiment, the test-driving experience system can control the operations of the active suspension system 550 and the virtual driving device 500 of the corresponding displayed vehicle in response to vehicle movement in the first vehicle function virtual experience scenario image and thus can provide effects such as vibration, tilting and/or shock matching the first vehicle function virtual experience scenario image to the corresponding displayed vehicle and a user in the displayed vehicle.

For example, in a case where a vehicle is traveling on an unpaved road in the first vehicle function virtual experience scenario image, the test-driving experience system can control the active suspension system 550 and/or the virtual driving device 500 such that irregular vibration and shock effects are delivered to the corresponding displayed vehicle.

In this manner, the test-driving experience system can provide a realistic vehicle function experience opportunity irrespective of a given experience environment (e.g., a displayed vehicle parked in an indoor space, or the like) by providing an augmented reality image through which a user can virtually experience a specific vehicle function through a displayed vehicle.

FIG. 11 is an exemplary diagram for describing the vehicle test-driving virtual experience mode according to an embodiment of the present invention.

Referring to FIG. 11, the test-driving experience system according to an embodiment can execute the vehicle test-driving virtual experience mode according to a determined test-driving experience mode (S109).

Specifically, in a case where the vehicle test-driving virtual experience mode is determined as a test-driving experience mode through the aforementioned test-driving experience mode selection interface, the test-driving experience system can execute the determined vehicle test-driving virtual experience mode.

Here, the test-driving experience system can provide a virtual driving environment setting interface upon execution of the vehicle test-driving virtual experience mode in an embodiment.

Specifically, the test-driving experience system can provide the virtual driving environment setting interface through which a parameter (e.g., first vehicle function on/off, or the like) and/or a scenario (e.g., a weather environment, the name of a road on which a vehicle will travel, an area, a course, and the like) to be set for a corresponding vehicle can be selected on the basis of the vehicle description application 111 at the time of performing virtual driving through the vehicle test-driving virtual experience mode.

In addition, the test-driving experience system can set environment conditions during virtual driving performed in the vehicle test-driving virtual experience mode on the basis of user input through the provided virtual driving environment setting interface.

In this manner, the test-driving experience system can set virtual driving environment conditions to be provided in the vehicle test-driving virtual experience mode according to user input such that a user can experience virtual driving in a driving environment that the user wants to experience, and thus can assist the user in experiencing a vehicle function or state that the user wants to check more easily.

In addition, the test-driving experience system may construct virtual driving parameters and/or a scenario optimized for the type of a corresponding displayed vehicle (e.g., a vehicle model type and/or a vehicle type) in advance in an embodiment.

For example, the test-driving experience system can preset, store and manage virtual driving parameters and/or a scenario optimized for the type of a displayed vehicle (e.g., a car, an SUV, a truck, a sports car, or the like).

Further, the test-driving experience system can set environment conditions during virtual driving performed in the test-driving virtual experience mode on the basis of virtual driving parameters and/or a scenario preset according to the type of a displayed vehicle in an embodiment.

In addition, the test-driving experience system may acquire and display a test-driving virtual experience scenario image (hereinafter, a test-driving virtual image) that is an augmented reality image providing a virtual driving experience environment on the basis of virtual driving parameters and/or a scenario set through the aforementioned virtual driving environment setting interface or virtual driving parameters and/or a scenario constructed in advance according to the type of a displayed vehicle.

Specifically, the test-driving experience system can generate a virtual driving augmented reality image on the basis of set virtual driving parameters and/or scenario conditions.

In addition, the test-driving experience system can display the augmented reality image generated as above, that is, test-driving virtual image, through the display unit of the window display device 300 provided on the front, rear, left and right sides of the corresponding displayed vehicle and/or the smart glasses 101 in the displayed vehicle.

Although an embodiment in which the test-driving experience system displays the test-driving virtual image through the window display device 300 will be described below, the present invention is not limited thereto.

For example, in a case where virtual driving parameters and/or scenario conditions (environment) such as "first vehicle function: on, weather: rain, road name: first highway" are set, the test-driving experience system can generate and display a test-driving virtual image providing a virtual environment in which a vehicle with the first vehicle function turned on is traveling on the first highway in the rain.

Here, the test-driving experience system may additionally provide effects such as sound, vibration, tilting and/or shock on the basis of the test-driving virtual image displayed through the window display device 300 of the displayed vehicle in an embodiment.

Specifically, the test-driving experience system can provide effects such as sound, vibration, tilting and/or shock matching the test-driving virtual image provided in the vehicle test-driving virtual experience mode in connection with the vehicle speaker 400, the virtual driving device 500 and/or the active suspension system 550.

That is, the test-driving experience system according to an embodiment can additionally provide various effects (sound, vibration, tilting and/or shock effects) matching the test-driving virtual image such that a user in the corresponding displayed vehicle can experience a more realistic virtual environment.

Here, the test-driving experience system according to an embodiment can change the displayed test-driving virtual image in real time according to operation of the user performed on the steering wheel, the brake and/or a function button of the corresponding displayed vehicle.

For example, when the user steers the steering wheel to the left, the test-driving experience system can update the test-driving virtual image to an image in which the corresponding vehicle moves to the left and display the image in real time.

Accordingly, the test-driving experience system can provide realistic augmented reality content through which the user can experience functions of the vehicle as if the user actually drives the vehicle even though the vehicle is a parked displayed vehicle.

FIG. 12 illustrates an example in which event content related to a second vehicle function is displayed in a test-driving virtual experience scenario image according to an embodiment of the present invention.

Referring to FIG. 12, the test-driving experience system may additionally output event content 10 related to the second vehicle function when a test-driving virtual image is displayed according to an embodiment.

Specifically, the test-driving experience system may include the event content 10 related to the second vehicle function in the test-driving virtual image and display the test-driving virtual image including the event content 10 on the basis of user settings and/or a preset process of the vehicle test-driving virtual experience mode set through the virtual driving environment setting interface.

In an embodiment, the test-driving experience system may provide the event content 10 for realizing a virtual environment in which a user can experience an operation of the second vehicle function during virtual driving experience based on the test-driving virtual image.

For example, the test-driving experience system can provide "human object suddenly appearing in front of a moving vehicle" as the event content 10 based on the augmented reality based, which is related to an advanced emergency braking system (AEBS) function, in order to additionally provide a virtual environment in which a user can experience the AEBS function that provides an automatic emergency braking function during virtual driving experience based on a test-driving virtual image.

Further, upon output of the event content 10 related to the second vehicle function in the test-driving virtual image, the test-driving experience system may cause the second vehicle function to be automatically executed in the corresponding virtual environment.

Accordingly, the test-driving experience system can allow the user (driver) to experience the second vehicle function by which the user can handle the event content 10 when the specific event content 10 is generated in a virtual driving experience environment.

That is, the test-driving system according to an embodiment can cause the second vehicle function to be automatically executed in the corresponding virtual environment in response to the event content 10 after output of the event content 10 related to the second vehicle function in the test-driving virtual image and thus can allow a user to virtually experience the second vehicle function according to user settings and/or a preset process even in the vehicle test-driving virtual experience mode based on augmented reality content.

In addition, the test-driving experience system according to an embodiment may additionally provide guide (description) information about the second vehicle function when the event content 10 related to the second vehicle function is provided.

Specifically, upon provision of the event content 10 related to the second vehicle function through a test-driving virtual image, the test-driving experience system may provide guide information about the second vehicle function on the basis of augmented reality content at a predetermined time after output of the event content 10.

For example, the test-driving experience system may provide the guide information about the second vehicle function through augmented reality content immediately before execution of the second vehicle function after output of the event content 10 related to the second vehicle function.

Here, the test-driving experience system according to an embodiment may provide the guide information about the second vehicle function provided as above using a virtual avatar based on augmented reality.

The operation of the test-driving experience system to provide the guide information about the second vehicle function using a virtual avatar may be performed like the aforementioned operation of providing the guide information about the first vehicle function using a virtual avatar, and thus redundant description will be summarized or omitted.

As described above, the test-driving experience system according to an embodiment provides virtual driving experience with respect to a displayed vehicle using the displayed vehicle with augmented reality content such that a user can experience various vehicle functions and driving feeling more realistically using the displayed vehicle as well as simply experiencing the displayed vehicle by checking the exterior and the interior of the parked displayed vehicle.

Furthermore, in a case where a predetermined user input (user operation performed on the steering wheel, brake and/or function button, or the like) is applied in response to the event content 10 (e.g., a human object suddenly appearing in front of the moving vehicle) after output of the event content 10 through a test-driving virtual image, the test-driving experience system according to an embodiment may provide a responsive test-driving virtual image according to whether the user input is reflected or whether the operation of the second vehicle function is reflected (activated).

Here, the responsive test-driving virtual image according to an embodiment may be an augmented reality image realized by reflecting at least one of a user input and an input for operation of the second vehicle function in the test-driving virtual image including the event content 10 when the user input is applied in response to the event content 10 related to the second vehicle function.

In an embodiment, the responsive test-driving virtual image may be realized as at least one of a user input based responsive image, a second vehicle function based responsive image, and a simultaneous responsive image.

Specifically, the user input based responsive image may be a test-driving virtual image that provides a virtual driving situation by reflecting only the user input with respect to the event content 10 related to the second vehicle function in a virtual image when the user input is generated.

That is, in the user input based responsive image, a process of automatically executing the second vehicle function for the event content 10 related to the second vehicle function is deactivated, and a situation corresponding to the event content 10 provided during virtual driving experience can be realized only with the user input in the corresponding virtual environment.

For example, when a predetermined user input (e.g., input for operating the brake, or the like) is detected after output of "human object suddenly appearing in front of moving vehicle" as the event content 10 related to the AEBS function that provides an automatic emergency braking function, the test-driving experience system can calculate a braking distance of the vehicle in the corresponding virtual environment on the basis of only the detected user input in a state in which the AEBS function is not executed and provide a first test-driving virtual image (user input based response image) generated according to the calculated braking distance of the vehicle.

Further, in an embodiment, the second vehicle function based responsive image may be a test-driving virtual image that provides a situation in which the second vehicle function is automatically activated and executed without reflecting a user input with respect to the event content 10 related to the second vehicle function in the virtual image even when the user input is generated.

That is, in the second vehicle function based responsive image, a situation corresponding to the event content 10 provided during virtual driving experience can be realized only through execution of the second vehicle function in the corresponding virtual environment regardless of user input.

For example, when a predetermined user input (e.g., input for operating the brake, or the like) is generated after output of "human object suddenly appearing in front of moving vehicle" as the event content 10 related to the AEBS function that provides an automatic emergency braking function, the test-driving experience system can calculate a braking distance of the vehicle acquired according to activation of the AEBS function instead of the generated user input and provide a second test-driving virtual image (second vehicle function based response image) generated according to the calculated braking distance of the vehicle.

In addition, in an embodiment, the simultaneous responsive image may be a test-driving virtual image that provides a virtual driving situation in which both a user input with respect to the event content 10 related to the second vehicle function and the second vehicle function operation are reflected when the user input is generated.

That is, in the simultaneous responsive image, both the user input and the operation with respect to the second vehicle function can be activated and reflected in a test-driving virtual image, and thus a situation corresponding to the event content 10 provided during virtual driving experience, in which both the user input and the operation of the second vehicle function are reflected, can be realized in the corresponding virtual environment.

For example, when a predetermined user input (e.g., input for operating the brake, or the like) is generated after output of "human object suddenly appearing in front of moving vehicle" as the event content 10 related to the AEBS function that provides an automatic emergency braking function, the test-driving experience system can calculate a braking distance of the vehicle acquired according to the user input and activation of the AEBS function and provide a third test-driving virtual image (simultaneous response image) generated according to the calculated braking distance of the vehicle.

As described above, the test-driving experience system can provide virtual driving situations in different conditions, such as a virtual driving experience image realizing a situation according to user input and a virtual driving experience image realizing a situation according to activation of the second vehicle function, such that various conditional situations such as a case in which a vehicle function is automatically executed and a case in which the vehicle function is not automatically executed can be effectively compared.

In addition, the test-driving experience system can effectively and intuitively provide the performance or quality level of the second vehicle function on the basis of augmented reality content.

Furthermore, the test-driving experience system may simultaneously provide multiple responsive test-driving virtual images on the basis of at least two of a user input based responsive image, a second vehicle function based responsive image, and a simultaneous responsive image according to an embodiment.

Specifically, the test-driving experience system can divide the screen of the window display device 300 on which a responsive test-driving virtual image is displayed into predetermined areas.

The test-driving experience system can display different responsive test-driving virtual images in the divided areas.

For example, the test-driving experience system can divide the screen of the window display device 300 on which a responsive test-driving virtual image is displayed into first to third areas, display a user input based responsive image in the first area, display a second vehicle function based responsive image in the second area, and display a simultaneous responsive image in the third area.

In this manner, the test-driving experience system can simultaneously provide responsive test-driving virtual images in different conditions such that results according to various conditional situations related to the second vehicle function can be compared more easily.

As described above, the system and method for providing vehicle function guidance and test-driving experience based on augmented reality content according to embodiments of the present invention have the effect of describing vehicle functions on the basis of augmented reality content using a displayed vehicle such that a user can virtually experience various functions of the vehicle without actually executing the functions.

In addition, the system and method for providing vehicle function guidance and test-driving experience based on augmented reality content according to embodiments of the present invention have the effects of providing virtual test-driving experience on the basis of augmented reality content using a displayed vehicle such that a user can virtually experience various scenario situations during driving through the vehicle as well as simply checking the exterior and the interior of the vehicle and providing vehicle function experience and guidance.

Moreover, the system and method for providing vehicle function guidance and test-driving experience based on augmented reality content according to embodiments of the present invention have the effects of describing vehicle functions and providing virtual test-driving experience on the basis of augmented reality content to improve user's understanding of various functions of the vehicle.

Further, the system and method for providing vehicle function guidance and test-driving experience based on augmented reality content according to embodiments of the present invention have the effects of describing vehicle functions and providing virtual test-driving experience on the basis of augmented reality content to assist a user in selecting a vehicle to be purchased and to increase an experience-purchase conversion rate with respect to a demonstrator vehicle displayed in a sales shop or a showroom.

In addition, the above-described embodiments of the present invention can be implemented in the form of program commands executable through various computer components and recorded in a computer-readable recording medium. The computer-readable recording medium may include a program command, a data file and a data structure independently or in combination. The program command recorded in the computer-readable recording medium may be specially designed and configured for the present invention or may be known to and used by those skilled in computer software. Examples of the computer-readable recording medium include hardware devices specially configured to store and execute program commands, such as a magnetic medium such as a hard disk, a floppy disk or a magnetic tape, an optical recording medium such as a CD-ROM or a DVD, a magneto-optical medium such as a floptical disk, a ROM, a RAM, and a flash memory. Examples of a program command include not only machine language code such as code generated by a compiler but also high-level language code executable by a computer using an interpreter. A hardware device may be converted into one or more software modules in order to perform processing according to the present invention, and vice versa.

Specific implementation described in the present invention is an embodiment and does not limit the scope of the present invention in any way. For brevity of the specification, description of conventional electronic components, control systems, software and other functions of the systems may be omitted. In addition, connections of lines or connecting members between components shown in the drawings illustratively represent functional connection and/or physical or circuit connection and may be represented as various alternative or additional functional connections, physical connection or circuit connections in actual devices. In addition, they may not be components essential for application of the present invention unless there is specific mention such as "essential" and "importantly".

Furthermore, although the present invention has been described with reference to preferred embodiments, those skilled in the art will appreciate that various modifications and variations can be made in the present invention without departing from the spirit or scope of the invention described in the appended claims. Accordingly, the technical scope of the prevent invention should not be limited to the detailed description of the specification, but should be determined by the appended claims.

What is claimed is:

1. A system for providing vehicle function guidance and test-driving experience based on augmented reality content, the system comprising:
    an augmented reality terminal for executing a vehicle description application realizing a vehicle function guidance or test-driving experience providing service on the basis of augmented reality content;
    a window display device provided on at least two windows including the front side of a vehicle and displaying the augmented reality content;
    a vehicle speaker for outputting audio according to the augmented reality content;
    a virtual driving device for providing haptic including predetermined vibration or tilting in the vehicle;
    a test-driving experience service providing server for controlling the window display device, the vehicle speaker or the virtual driving device in connection with the vehicle description application; and
    an active suspension system for providing a predetermined vibrating or tilting effect delivered to the vehicle,
    wherein the test-driving experience service providing server controls at least one of the virtual driving device and the active suspension system such that the vibrating or tilting effect corresponding to the augmented reality content is delivered to the vehicle, and wherein, when entry of the augmented reality terminal into the vehicle is detected, the test-driving experience service providing server provides a test-driving experience mode in which functions of the vehicle are experienced using the augmented reality content on the basis of the vehicle description application of the detected augmented reality terminal.

2. The system of claim 1, wherein the test-driving experience mode includes a vehicle function virtual experience mode in which guidance of functions of the vehicle is provided on the basis of the augmented reality content and a vehicle test-driving virtual experience mode in which a user enters the vehicle and experiences virtual driving.

3. The system of claim 2, wherein the test-driving experience service providing server executes the vehicle function virtual experience mode to provide guide information about a first vehicle function matching an object sensed by an image sensor of the augmented reality terminal.

4. The system of claim 3, wherein the test-driving experience service providing server controls the augmented reality terminal to provide the guide information about the first vehicle function through a virtual avatar based on augmented reality.

5. The system of claim 2, wherein the test-driving experience service providing server executes the vehicle test-driving virtual experience mode to provide a virtual driving environment setting interface by which at least one of a virtual driving parameter and a scenario for setting an environment of the virtual driving on the basis of the vehicle description application is set.

6. The system of claim 5, wherein the test-driving experience service providing server provides a test-driving virtual experience scenario image which is an augmented reality image providing the virtual driving experience environment on the basis of at least one of the set virtual driving parameter and scenario.

7. The system of claim 6, wherein, when the test-driving virtual experience scenario image is output, the test-driving experience service providing server includes event content related to a second vehicle function in the test-driving virtual experience scenario image and outputs the test-driving virtual experience scenario image.

8. The system of claim 7, wherein the test-driving experience service providing server provides the test-driving virtual experience scenario image on the basis of at least one of a user input for performing an operation with respect to driving of the vehicle and an input for operation according to automatic activation of the second vehicle function upon output of the event content.

9. A method for providing vehicle function guidance and test-driving experience based on augmented reality content in a test-driving experience service providing server, the method comprising:
   detecting entry of an augmented reality terminal into a vehicle;
   executing a vehicle description application on the basis of the detected augmented reality terminal;
   providing a test-driving experience mode in which functions of the vehicle are experienced using the augmented reality content on the basis of the executed vehicle description application;
   executing the determined test-driving experience mode;
   outputting the augmented reality content on the basis of the executed test-driving experience mode; and
   providing a predetermined vibrating or tilting effect according to the output augmented reality content to the vehicle.

10. The method of claim 9, wherein the executing of the determined test-driving experience mode comprises:
   executing a vehicle function virtual experience mode in which guidance of functions of the vehicle is provided on the basis of the augmented reality content; or
   executing a vehicle test-driving virtual experience mode in which a user enters the vehicle and experience virtual driving.

11. The method of claim 9, wherein the outputting of the augmented reality content comprises providing the augmented reality content on the basis of at least one of a user input for performing an operation with respect to driving of the vehicle and an input for operation according to automatic activation of a function of the vehicle.

* * * * *